Jan. 8, 1957   J. A. PAULIUS, JR., ET AL   2,776,810
PIVOTAL BRACKET
Filed Jan. 9, 1952
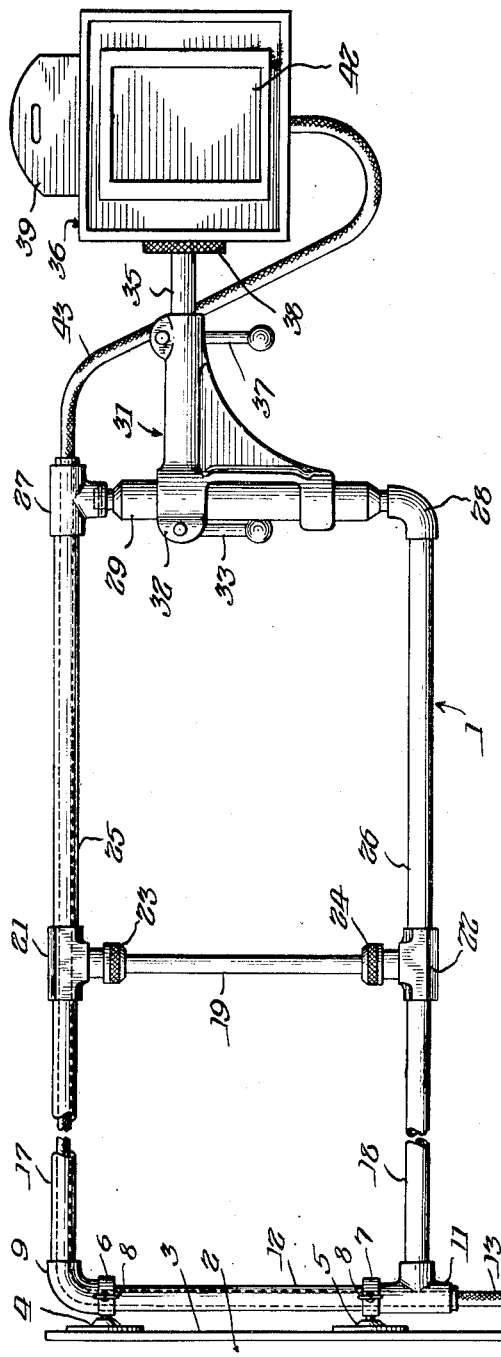
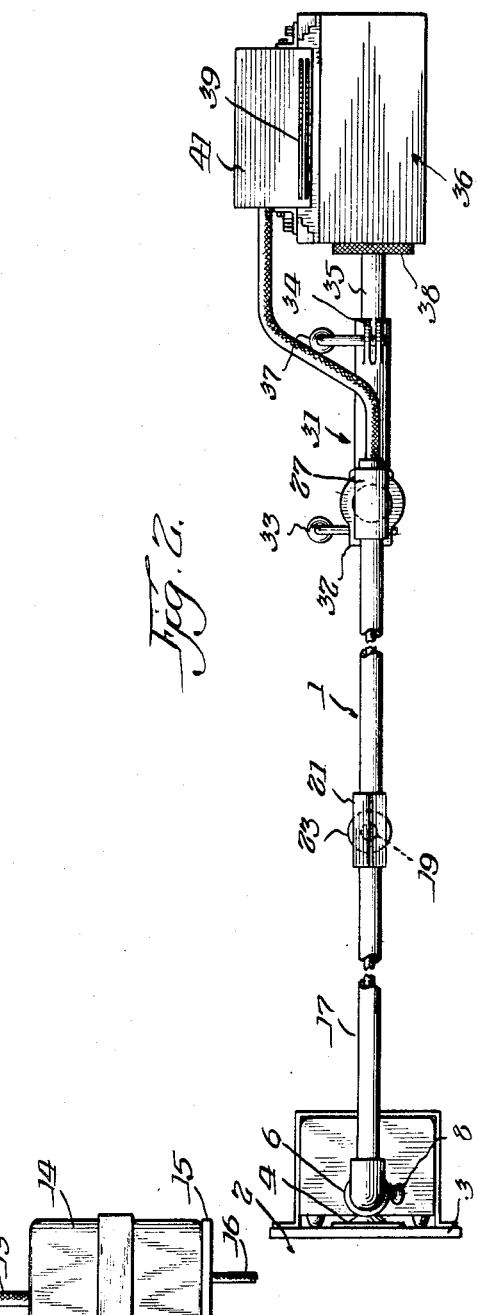
Inventors.
John A. Paulius, Jr. &
Paul E. Roush.
By Joseph O. Long Atty.

United States Patent Office 2,776,810
Patented Jan. 8, 1957

2,776,810

PIVOTAL BRACKET

John A. Paulius, Jr., and Paul E. Roush, Chicago, Ill., assignors to Crane Co., Chicago, Ill., a corporation of Illinois Application January 9, 1952, Serial No. 265,616

1 Claim. (Cl. 248—279)

This invention relates to a novel swivel bracket. More specifically, it is concerned with the type of bracket specially useful for application with a photostat camera or the like.

In order to obtain a better appreciation of the background of this invention, it should be understood that in the past it has been a considerable problem to provide a quick, simple and economical means for photographing microfilms or the like. It has been discovered that if a special form of swiveling bracket is supplied to an adjacent wall, for example, with a photostat camera, the bracket can be suitably mounted easily and made adjustably movable for use with such device. Thus, it is one of the more important objects of this invention to dispense with the usual cumbersome devices heretofore employed which lack the pivotability and also adjustability with relation to the lens of a photostat camera.

Another object is to provide for a construction in which comparatively economical and simple available fittings may be used, as, for example, plumbing type of flow fittings, for the mounting of the film adaptor, and in which the rigid members provide a sturdy adjustable means for holding a shaft of the microfilm adaptor securely.

Another object is to permit for the use of such fittings specifically as elbows, T, pipe nipples and the like to permit the employment of a concealed electrical wiring arrangement utilizing the inside diameters of the fittings and pipe.

A further important object of the invention is to provide for a structure in which ring clamps fastened into a wall or wall flanges provide a pivoting support having about 180 degrees of movement, for example, and being able to stop adjustably in any intermediate position by means of thumb screws conveniently located in the ring clamp structure as hereinafter illustrated and more specifically described.

A further important object is to provide a bracket structure in which a vertical member mounted in the center of the frame affords a more rigid arrangement than that heretofore available.

Another object is to provide for a double pivoting bracket in which another vertical member serves to provide a pivotal action for a shaft of the film adaptor and it also permits of a 180 degrees movement for relatively close alignment thereof.

Other objects and advantages will become more readily apparent upon proceeding with the following specification read in light of the accompanying drawings, in which Fig. 1 is a side exterior view of a bracket embodying our invention.

Fig. 2 is a plan exterior view of the structure shown in Fig. 1.

Similar reference numerals refer to similar parts throughout the several views.

Referring now to Fig. 1, the novel bracket generally designated 1 is mounted pivotally on a wall 2 of a room for example, a wall plate 3 preferably having in spaced apart relation the anchoring wall flanges 4 and 5. Each of the said wall flanges is provided with a threaded ring clamp receivable therewithin securely and designated 6 and 7 respectively. The latter ring clamps preferably are of a banded type and are preferably provided with the thumb screws at 8, as indicated. The bracket supporting portion is provided by means of the elbow fitting 9, which is pivotally received within the ring clamp 6 and the lower T fitting 11 is similarly received within the ring clamp 7, the said fittings being hollow as well as the tubing connecting as at 12, thus to allow conveniently for the extension therethrough of the electrical wiring cord 13, the latter electrical cord extending downwardly as shown from the electrical transformer 14, the latter preferably being supported on the wall base member 15 and having the wiring cord 16 leading to a suitable source of electric power.

At the upper end portion of the bracket 1, it will be noted that the horizontally extending tubing 17 projects outwardly from the elbow fitting 9 and similarly the tubing 18 projects transversely from the T fitting 11. Both the upper and lower tubing sections 17 and 18 are connected by means of a vertically extending tube 19 serving as a brace or cross support therebetween having at its extremities the upper and lower T fittings 21 and 22, the latter fitting preferably being compression type of conventional locknut similar to that used in automotive compression fittings. It is applied at 23 and 24 to hold the tubing 19 rigidly and firmly in position.

Extending beyond the T fittings 21 and 22 the tubing 25 is employed engaging at one end limit the T fitting 27. At the lower end portion, the horizontal tubing 26 is connected to the elbow fitting 28. Between the two fittings 27 and 28, a vertical shaft member 29 is journally positioned and upon which the pivotally movable sub-bracket assembly portion, generally designated 31, is mounted and is preferably arranged as a split portion at the bearing 32, thereby to allow for the use of a locking screw 33 whenever it is desired to hold the sub-bracket assembly 31 against pivotal movement or rotation on the shaft 29. It will also be noted that the member 31 by reason of the adjusting screw 33 also allows for relative axial movement of the member 31 upon the shaft 29. At its opposite end portion, the sub-bracket 31 is preferably split as shown more clearly in plan in Fig. 2, which construction is used in order to permit the horizontal rod 35 extendable relative to the member 31 to have greater adjustability in positioning the microfilm adaptor, generally designated 36, thus locking the horizontal shaft 35 in desired rotative position. This is accomplished by means of a second adjusting screw 37. In addition, the film adaptor 36 is provided with a locking screw 38 to permit selective pivotal mounting relative to the shaft of the adaptor 36. The upper end portion of the adaptor is provided with the usual slot for receiving a film holder 39 and at the back, as shown more clearly in Fig. 2 is a suitable container 41 for lighting the adaptor 36 while the film carrier 39 is held in place. A glass member 42 allows for the transparency of film to be photographed.

It should be understood that all connections with the fittings 9, 11, 21, 22, 27, and 28 may be made by means of either a soldered or threaded connection. The wiring 43 as indicated is carried through the interior of the upper hollow tubing 17 and 25 and thence into the elbow 9 and down into the tubing 12 extending into the fitting 11 as indicated. There, it is connected to the wiring 13 and extends into the transformer 14 as shown.

It will be clear that pivotability is provided not only at the ring clamps 6 and 7, but also at the connection of the shaft 29, and, in addition, there is the feature of adjustable extendability provided by means of the shaft 35 as well as the rotatability to a limited extent provided by means of the adjusting narrow nut 38. Insofar as is known, no one previously has attained such high degree of adjustability and convenience of assembly as accomplished by this type of pivotal bracket or board.

While only a single embodiment has been described, this is primarily for purpose of illustration and is not one of limitation. Therefore, the invention should be measured by the scope of the appended claim.

We claim:

A pivotal bracket comprising in combination a plurality of tubes arranged to form an assembly of substantially frame-like configuration, said assembly including a pair of spaced-apart horizontal tubes having adjacent one end thereof spaced-apart anchoring wall flanges with pivotal connections thereon for attachment to a wall or the like, an end vertical tube adjacent to the said wall flanges being connected at its opposite limits to said horizontal tubes, the wall flange connections including upper and lower ring clamps for adjustably supporting said end vertical tube, the opposite ends of the said pair of spaced-apart horizontal tubes having therebetween a pivotally mounted vertical connecting shaft, the said latter shaft having thereon means comprising a sub-bracket assembly portion pivotally mounted between the said horizontal tubes, the said sub-bracket assembly portion having a horizontal hollow extension therefrom constituting an adjustable apertured connection for pivotally and extensibly receiving a horizontally extending shaft for a microfilm adaptor or the like, the said adjustable sub-bracket apertured extension including a split clamping member having a transversely extending adjustable screw member thereon cooperating with said pivotally mounted vertically connecting shaft to grip the latter members and to hold the said clamping member in predetermined axial position relative to said connecting shaft, the said split clamping member being adjustable and predeterminately movable axially and also being rotatable relative to the said vertical connecting shaft upon suitable actuation of said adjustable member to release said clamping member on the shaft.

References Cited in the file of this patent

UNITED STATES PATENTS

| | | |
|---|---|---|
| 365,859 | Porter | July 5, 1887 |
| 478,987 | Colby | July 19, 1892 |
| 504,828 | Elmoor | Sept. 12, 1893 |
| 595,284 | Baum | Dec. 7, 1897 |
| 759,925 | Smith | May 17, 1904 |
| 1,059,856 | Fox | Apr. 22, 1913 |
| 1,224,463 | Hawthorne | May 1, 1917 |
| 1,812,744 | Glenn | June 30, 1931 |
| 2,047,325 | Jones | July 14, 1936 |
| 2,072,472 | Barbero | Mar. 2, 1937 |